United States Patent [19]
Eldred

[11] 4,398,589
[45] Aug. 16, 1983

[54] PUMPING AND METERING DEVICE FOR FLUID METALS USING ELECTROMAGNETIC PUMP

[75] Inventor: Donald Eldred, Saratoga, Calif.
[73] Assignee: General Electric Company, San Jose, Calif.
[21] Appl. No.: 305,524
[22] Filed: Sep. 25, 1981
[51] Int. Cl.³ .............................................. B22D 39/00
[52] U.S. Cl. .................................... 164/337; 222/594; 222/318; 417/50
[58] Field of Search ................... 417/45, 50; 164/133, 164/337; 222/590, 594, 318

[56] References Cited

U.S. PATENT DOCUMENTS

| | | | |
|---|---|---|---|
| 3,591,052 | 7/1971 | Nef | 222/64 |
| 3,696,858 | 10/1972 | Seulen et al. | 417/50 X |
| 3,837,531 | 9/1974 | Eickelberg | 222/594 X |
| 4,030,538 | 6/1977 | Carbonnel | 164/133 X |
| 4,061,176 | 12/1977 | Cabonnel | 164/61 |
| 4,200,143 | 4/1980 | Matter et al. | 222/318 X |

FOREIGN PATENT DOCUMENTS 2747133 4/1978 Fed. Rep. of Germany ...... 164/133

*Primary Examiner*—David A. Scherbel
*Attorney, Agent, or Firm*—Ivor J. James, Jr.; Samuel E. Turner; Raymond G. Simkins

[57] ABSTRACT

Pumping and measuring apparatus for fluid metals comprising an electromagnetic pump which operates in two modes; first, an idling mode in which the pump operates at one rate of flow and continually circulates fluid metal out of a reservoir, through an opening in a conduit and back to the reservoir; second, a delivery mode in which the pump operates at a higher rate of flow and circulates fluid as in the idling mode, and further raises the fluid metal to a higher opening in the conduit for delivery therethrough. A timing control for selectively adjusting the durations of each mode as well as the time intervals between modes allows high accuracy of measurements of quantities of fluid metal delivered.

7 Claims, 2 Drawing Figures

PUMPING AND METERING DEVICE FOR FLUID METALS USING ELECTROMAGNETIC PUMP

BACKGROUND OF THE INVENTION

The present invention relates to fluid metal handling means and, more particularly, to new and improved fluid metal pumping and metering means requiring no valves or moving parts in the metal flow path.

In the process of casting metal objects, molten metal must be transferred from a source such as a crucible to the molds or dies to be filled. If this process is to be accomplished through piping arrangements rather than by ladeling, certain problems arise in measuring the quantity of molten metal to be transferred. The measuring is commonly done by filling a known volume with the molten metal and then delivering it to the mold. This procedure suffers from several disadvantages. First, if a change in the amount of metal destined for the mold is to be made, the container measuring the known volume must be changed. Second, this procedure requires the use of valves and pumps having moving parts which contact the molten metal. This is disadvantageous in that the molten metal can sometime solidify and obstruct the functioning of the moving parts and also in the fact that certain molten metals are highly corrosive and can degrade these moving parts. Third, if the casting process is interrupted in a manner which causes molten metal to be isolated in a place distant from the crucible and mold, problems can arise in controlling the temperature of the isolated metal.

SUMMARY OF THE INVENTION

Accordingly, it is an object of the present invention to provide a new and improved pumping and metering device for fluid metals having no moving parts in contact with the molten metal.

It is a further object of the present invention to provide a new and improved pumping and metering device for fluid metals utilizing no valves to divert a channel of flowing metal.

It is a further object of the present invention to provide a new and improved pumping device for drainage of a crucible of molten metal.

It is a further object of the present invention to provide a new and improved pumping and metering device for fluid metals which provides continuous circulation of molten metal in the crucible to assure homogeneity of the molten material.

The foregoing objects and other objects are achieved by the present invention wherein an electromagnetic pump withdraws fluid metal from a crucible or other molten metal reservoir. The pump discharges the metal into a conduit having at least two outlets, one above the other. The lower outlet connects to a pipe which returns metal to the crucible. The upper outlet connects to a delivery pipe which leads to a casting machine. When the pump operates at a certain rate of flow, the fluid pressure in the conduit is sufficient to bring the level of the metal up to only the lower outlet and thus metal flows through only the pipe returning to the crucible. When the pump operates at a predetermined higher rate of flow, the pressure in the conduit is sufficient to bring the level of metal to both outlets in the conduit and thus metal can flow through the delivery pipe to the casting machine as well as through the return pipe to the crucible. Control means enabling selective adjustments to the flow rates and to the timing of the higher rate of flow allow extremely accurate predetermined amounts of metal to be delivered to the casting machine. Additionally, if the timing arrangement is such that the pump operates continually at the higher rate of flow, and if the source is not replenished, the apparatus is effective for evacuating the crucible.

DETAILED DESCRIPTION OF THE INVENTION

Figure 1:
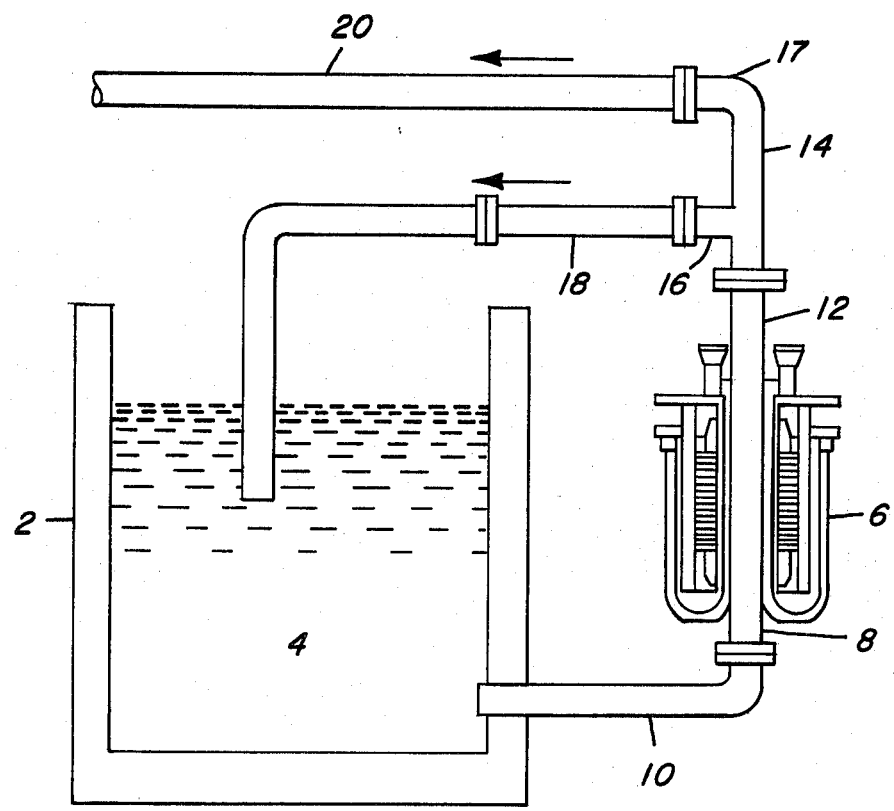
FIG. 1 is a cross-sectional view of a system embodying the invention.

Referring to FIG. 1, a crucible or reservoir 2 contains molten metal 4. Suitable heating means for the crucible is included in the apparatus but is not shown. An electromagnetic pump means 6 of a type well known in the art includes an inlet 8 and when energized draws molten metal through a pipe 10, and expels it under pressure through a pump outlet 12 connected to an erect and preferably vertical conduit 14. The conduit 14 comprises a plurality of outlets, one of which is an outlet 16 at a relatively low level above the pump outlet 12. The outlet 16 connects to a return pipe 18 which extends into the reservoir. A second outlet 17 of the conduit 14 is located at a higher level relative to the outlet 16 and connects to delivery pipe 20 which leads to a casting machine (not shown).

Figure 2:
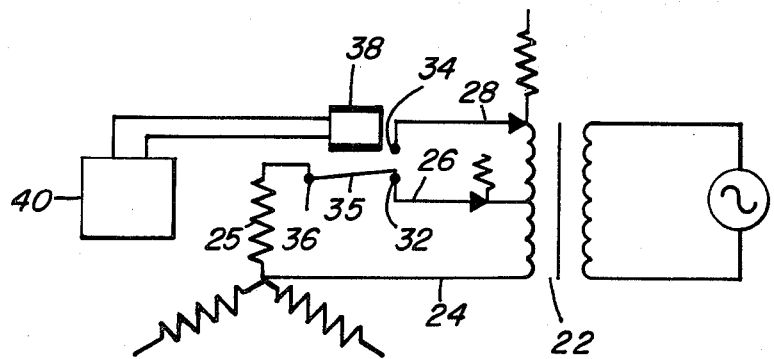
FIG. 2 is a schematic diagram of the electrical control means of the system.

Referring to FIG. 2, a selectively and adjustably operable control means is shown whereby electrical power is supplied to one coil of an autotransformer 22. The other coil of the autotransformer is connected across one phase of the electromagnetic pump by means of leads 24, 26 and 28. Only one phase of the pump's three phases is shown to facilitate disclosure and this phase is symbolically represented by a load resistance 25. Lead 26 taps a lower voltage from the autotransformer than lead 28. The voltage to both leads 26 and 28 can be adjustable as, for example, through potentiometers as shown to allow variation in the voltages provided. Lead 26 is connected to a contact 32 and lead 28 is connected to a contact 34. A relay 38 selectively switches one end of an armature 35 to contacts 32 or 34 to make a connection with either one or the other but not both such contacts. The other end of the armature 35 is connected to junction 36. A connection from junction 36 continues to the electromagnetic pump to complete a circuit therethrough.

When the armature 35 connects contact 32 to junction 36, the pump is supplied current at a relatively low voltage resulting in a low rate of flow through the pump to the conduit 14. Alternatively, when the armature 35 connects contact 34 to junction 36, a higher voltage current is supplied, resulting in a higher rate of fluid flow to the conduit 14.

The relay 38 is adjustably controlled by a timing device of a well-known type and generally indicated at 40. The timing device 40, upon selective actuation by an operator, determines the lengths of time leads 26 and 28 alternately remain connected. Thus, the timing device 40 determines the durations of time during which the electromagnetic pump is supplied with high or low voltage and thus determines the time duration of operation at low and high pump pressures. Therefore, the timing device determines the volumes of the amounts or "charges" of liquid metered by the system, as well as the time intervals between charges.

During operation, the pump will operate in either an idling mode at the above-mentioned low voltage or in a delivery mode at the above-mentioned high voltage. When supplied by the low voltage, the pump produces a flow rate of liquid metal which creates a pressure in conduit 14 such that the level of liquid metal in the conduit reaches the level of, and flows through, the lower conduit 16 but does not reach the level of the higher outlet 17. The metal will continuously flow through the lower outlet 16 through the return pipe 18 and back to the reservoir. When it is desired to deliver metal to a casting machine or to evacuate the reservoir, the pump is switched to operate at the higher voltage. In this case, the flow rate of the pump is such that the pressure created in conduit 14 is sufficient to raise the liquid metal level up to the level of the higher outlet 17 such that metal can flow through the delivery pipe 20 to its destination. At the same time, metal will continue to flow through the return pipe 18 substantially as before.

The quantity of liquid metal which is delivered when the pump is operated at the higher voltage is determined by the length of time or duration of application of such voltage as well as the magnitude of the voltage itself determining the flow rate of the pump during this time. Thus, the delivery of an accurately measured quantity of liquid metal is accomplished by selectively adjusting the higher voltage to a desired value and similarly adjusting the length of time of its application to a desired value. The voltage adjustment can be done by, for example, using a potentiometer in lead 28 or by changing the tap on the outer transformer 22 to which that lead connects. The timing adjustment can be accomplished by the timing circuit of a well-known type and generally indicated at 40 in FIG. 2.

The following modifications of this invention are possible. First, it might be desirable in certain applications to operate the pump at a lower voltage during the idling cycle so that the level of fluid in conduit 14 does not completely extend the full height or diameter of the lower outlet 16. Instead, the pump can be operated at a voltage at which the liquid level is at a height such that return pipe 18 is only partially filled with flowing metal. Second, it may be desirable to utilize two electromagnetic pumps in series and operate both during the delivery cycle and only one during the idling cycle rather than using a single pump operated at two different voltages. Third, it is possible to utilize several delivery pipes perhaps at different levels and a pump operated at several different voltages to provide means effective to select the particular pipes which will deliver metal at a given time. Fourth, since the amount of fluid delivered will depend somewhat upon the level of liquid metal existing in the reservoir, it may be desirable to incorporate automatic sensing means to read the level and to signal when additional metal should be added. Fifth, only a part of the liquid metal which is drawn into the pump inlet 8 is returned to the reservoir through return pipe 18 during operation in the delivery mode. The rest is delivered to the metal destination. Thus, extending the duration of the delivery mode operation will eventually empty the reservoir of all fluid metal above the level of the pipe 10, enabling the present invention to be additionally used as an evacuating pump for a molten metal fluid reservoir.

Accordingly it is desired to secure by the appended claims, all modifications falling within the true spirit and scope of the invention.

What is claimed is:

1. Apparatus for delivering fluid metal to a casting machine comprising:
    a reservoir for containing fluid metal and having an outlet;
    electromagnetic pump means having an inlet and an outlet, with said inlet connected to the outlet of said reservoir; and
    a conduit connected to the outlet of said pump means and having
        (a) a first outlet positioned at a first level and effective for returning metal to said reservoir whenever said pump means is operating above a first predetermined flow rate, and
        (b) a second outlet positioned at a level above said first outlet and effective for directing metal to said casting machine only when said pump means is operating at a second predetermined flow rate higher than said first predetermined flow rate.

2. An apparatus as described in claim 1, wherein said conduit comprises an erect section having a plurality of outlets positioned at different levels.

3. An apparatus according to claim 1, further comprising control means effective for selectively energizing said pump means to effect said predetermined first and second flow rates.

4. An apparatus according to claim 1, further comprising control means effective for selectively operating said pump means at said first and second predetermined flow rates for predetermined durations.

5. An apparatus according to claim 1, further comprising control means effective for adjustably predetermining the magnitudes of said first and second predetermined flow rates.

6. An apparatus according to claim 1, further comprising control means effective for adjustably predetermining the time durations of said first and second predetermined flow rates.

7. Apparatus for delivering fluid metal to a casting machine comprising:
    a reservoir for containing fluid metal and having an outlet;
    electromagnetic pump means having an inlet and an outlet, with said inlet connected to the outlet of said reservoir;
    a conduit connected to the outlet of said pump means and having
        (a) a first outlet positioned at a first level and effective for returning metal to said reservoir whenever the pump means is operating above a first predetermined flow rate; and
        (b) a second outlet positioned at a level above said first outlet and effective for directing metal to said casting machine only when said pump means is operating at a second predetermined flow rate higher than said first predetermined flow rate; and
    control means effective for selectively energizing said pump means to effect said predetermined first and second flow rates, adjustably predetermining the magnitudes of said first and second predetermined flow rates, and operating said pump means at said first and second predetermined flow rate for predetermined durations.

* * * * *